United States Patent [19]

Futaba

[11] 4,221,137
[45] Sep. 9, 1980

[54] BALL NUT TYPE STEERING GEAR

[75] Inventor: Takeshi Futaba, Yao, Japan

[73] Assignee: Koyojidoki Kabushiki Kaisha, Kashihara, Japan

[21] Appl. No.: 18,034

[22] Filed: Mar. 6, 1979

[51] Int. Cl.$^2$ .............................................. F16H 1/18
[52] U.S. Cl. ............................. 74/216.3; 74/424.8 R; 74/459; 74/499
[58] Field of Search ................ 74/424.8 R, 459, 499, 74/216.3, 89.15

[56] References Cited

U.S. PATENT DOCUMENTS

| 2,779,206 | 1/1957 | Doerfner ............................... 74/459 |
| 3,810,395 | 5/1974 | Takahashi et al. ................... 74/89.15 |

FOREIGN PATENT DOCUMENTS 4633940 11/1971 Japan .

*Primary Examiner*—Leslie Braun
*Assistant Examiner*—Conrad Berman
*Attorney, Agent, or Firm*—Fleit & Jacobson

[57] ABSTRACT

In a ball nut type steering gear for a motor vehicle having two trains of balls confined within passageways formed by the helical grooves in a threaded shaft and a ball nut which surrounds the threaded shaft, two major diameter portions disposed in spaced-apart relation are formed in the threaded shaft. When the motor vehicle travels straight ahead, the balls are rollingly engaged in the helical grooves in the major diameter portions of the threaded shaft and the ball nut, and there is no play between the grooves and the balls which are engaged in the grooves. However, when the steering wheel is manipulated, the balls are rollingly engaged in the helical grooves in portions of the threaded shaft which are smaller in diameter than the major diameter portions of the threaded shaft, and there is play of a certain extent between the balls and the helical grooves.

4 Claims, 10 Drawing Figures

PRIOR ART FIG. 1
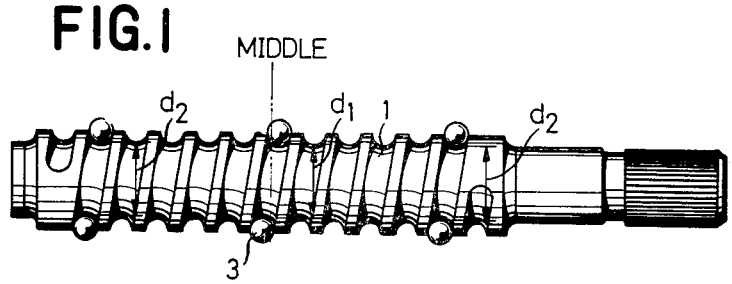
PRIOR ART FIG. 2
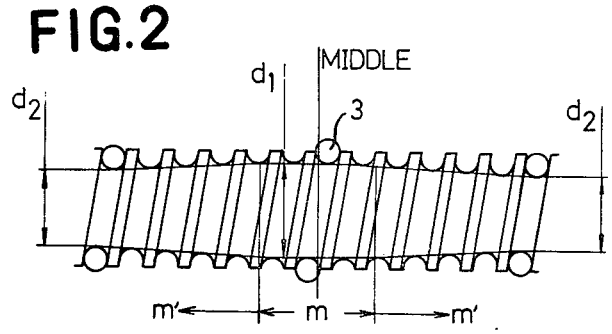
PRIOR ART FIG. 3
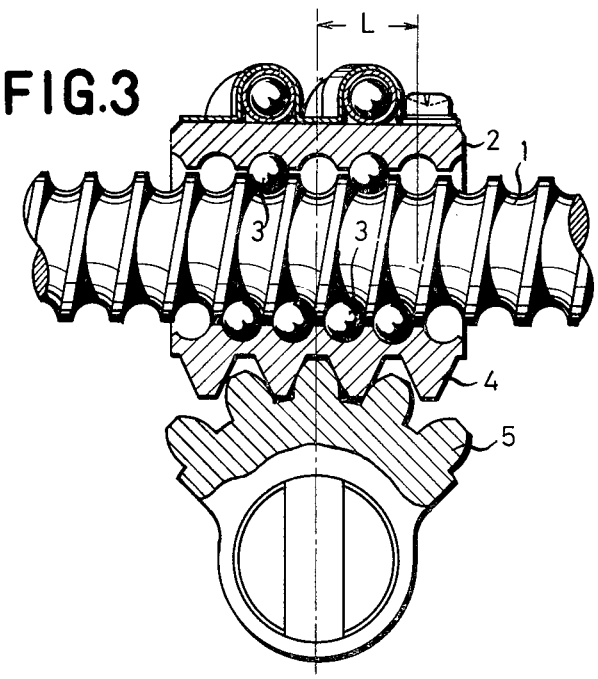

4,221,137

BALL NUT TYPE STEERING GEAR

BACKGROUND OF THE INVENTION

This invention relates to ball nut type steering gears for motor vehicles, and more particularly to a ball nut type steering gear which enables the feel of the steering wheel in the hands of the driver to be improved when a motor vehicle is driven straight ahead at high speed.

In ball nut type steering gears of the prior art, there is certain play between the balls and the helical grooves in which the balls are rollingly engaged so as to permit the balls to smoothly roll in the helical grooves during operation, by taking into consideration possible errors which might be committed during manufacture with regard to the configuration of the helical threads of the ball nut and the threaded shaft, the lead of the threads and the circularity of the helical grooves.

On the other hand, when a motor vehicle is driven at high speed, a reaction of the tires is transmitted to the driver by way of the steering gear and steering wheel. The motor vehicle fitted with a steering gear of the prior art described hereinabove would deviate from a desired course in travel, particularly when driven at high speed, thereby making the driver feel uneasy about the stability of driving. This stems from the fact that the play referred to hereinabove between the balls and the helical grooves causes the motor vehicle to travel in serpentine movement and makes it impossible to drive the vehicle in a stable manner, particularly when the motor vehicle is driven to travel along a straight course at high speed.

In order to obviate the aforesaid disadvantages of the prior art, proposal has been made to provide a major diameter portion in the middle range of the threaded shaft, and tapering portions connected at one end thereof to the major diameter portion and having a minor diameter portion at the other end thereof, so as to reduce to zero the play between the balls and the helical grooves in which the balls are rollingly engaged during the travel of the vehicle along a straight course and to increase the rigidity of the connection between the threaded shaft and the ball nut. The aforesaid diameters may be either the pitch diameter or the root diameter of the thread of the threaded shaft. Some disadvantages are associated with the system proposed. Generally, the steering gear of this type has two trains of balls, and the balls of one train would contact the major diameter portion of the threaded shaft in the middle range thereof when the steering wheel is manipulated to turn the steering shaft through a small angle of rotation. Thus there would be little or no play between the balls of one train and the helical grooves in which they are rollingly engaged, thereby requiring the exertion of a force in manipulating the steering wheel.

SUMMARY OF THE INVENTION

One object of this invention is to provide a ball nut type steering gear for a motor vehicle which enables, by a simple construction, the amount of movement of the ball nut to be reduced and the stability of the steering gear to be increased so that the feel of the steering wheel in the hands of the driver will be improved particularly when the motor vehicle travels along a straight course at high speed.

Another object is to provide a ball nut type steering gear for a motor vehicle which enables the range, in which the play between the balls and the helical grooves in the threaded shaft and the ball nut becomes zero or is minimized, to be limited to an essential minimum for stabilizing the travel of the motor vehicle along a straight course, whereby the steering wheel can be manipulated quickly and smoothly when the driver desires to change the direction of travel.

According to the invention, there is provided a ball nut type steering gear for a motor vehicle comprising a threaded shaft and formed with a helical groove, a ball nut formed with a helical groove and mounted over said threaded shaft for movement axially of the threaded shaft through two trains of balls, a rack formed on the outer periphery of said ball nut, and a sector gear in meshing engagement with said rack, said two trains of balls being confined in passageways formed by the helical grooves in said threaded shaft and said ball nut to move the ball nut axially of the threaded shaft as the latter is rotated to thereby rotate said sector gear to change the direction of travel of the motor vehicle, wherein the improvement comprises two major diameter portions formed in said threaded shaft and spaced apart from each other by a minor diameter portion, so that said two trains of balls are brought into engagement in the helical grooves in the major diameter portions of the threaded shaft and the ball nut only when the motor vehicle travels along a straight course and there is no play between the balls and the helical grooves in which the balls are brought into rolling engagement, said diameters being either the pitch diameter or the root diameter of the thread.

Additional and other objects, features and advantages of the invention will become apparent from the description set forth hereinafter when considered in conjunction with the accompanying drawings.

BRIEF DESCRIPTION OF THE DRAWINGS

FIG. 1 is a front view of a threaded shaft of the prior art;

FIG. 2 is a schematic view in which a change in the diameter of the threaded shaft shown in FIG. 1 is exaggerated;

FIG. 3 is a front view of a ball nut type steering gear of the prior art;

DETAILED DESCRIPTION OF THE PREFERRED EMBODIMENT

Figure 4:
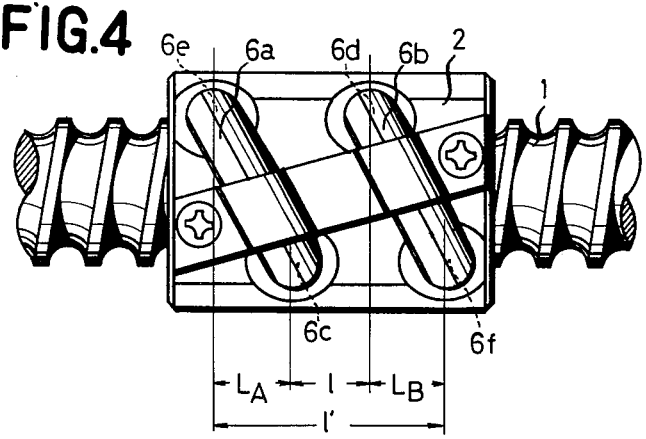
FIG. 4 is a plan view of one embodiment of this invention.

Before describing the present invention in detail, a steering gear of the ball nut type of the prior art will be outlined to enable the invention to be better understood, referring to FIG. 1 to FIG. 3. FIG. 1 shows a threaded shaft of a ball nut type of the prior art, and FIG. 2 is a view in which a change in the diameter of the threaded shaft shown in FIG. 1 is exaggerated in the interest of simplifying an understanding of the prior art.

The threaded shaft 1 has, as shown in FIGS. 1 and 2, a portion m of a major diameter $d_1$ in the middle range thereof which extends in an axial direction for a suitable length, and tapering portions m' each connected at the one end thereof to the major diameter $d_1$ portion m and having a minor diameter $d_2$ at the other end thereof. When the motor vehicle travels straight ahead, balls 3 are engaged in the helical grooves in the major diameter portion m and the ball nut, and there is no play between the grooves and the balls 3. However, when the balls are engaged in the helical grooves in the tapering portions m', there is play between the balls and the helical grooves.

If the threaded shaft 1 is constructed such that there is no play between the balls 3 and the helical grooves when the balls 3 are rollingly engaged in the helical grooves in the major diameter $d_1$ portion m, one of the two trains of balls confined in passageways formed by the helical grooves in the threaded shaft 1 and a ball nut 2 as shown in FIG. 3 will be fitted in the helical grooves in the major diameter $d_1$ portion m and no play will be provided between the balls and the helical grooves when the steering wheel is turned clockwise or counter clockwise, unless the ball nut 2 is permitted to move a distance L to enable the two trains of balls to move a distance corresponding to the length of the major diameter $d_1$ portion m and to be brought out of engagement in the helical grooves in the major diameter $d_1$ portion m. Therefore, the play for permitting the ball nut 2 to move smoothly will not be provided until the angle of rotation of a sector gear 5 in meshing engagement with a rack 4 of the ball nut 2 becomes considerably large. Thus, the prior art steering gear has the disadvantage that a large force must be exerted to manipulate the steering wheel.

In the prior art, two trains of balls 3 spaced apart from each other axially of the threaded shaft 1 should both be brought into rolling engagement in the helical grooves in the major diameter $d_1$ portion m when the motor vehicle travels along a straight course, so that the range in which there is no play between the balls 3 and the helical grooves is unnecessarily large as indicated by the distance L of movement of the ball nut 2. This has influences on the service life of the ball nut type steering gear and reduces its durability. When an error occurs during manufacture, there would be a large variation in the torque along the distance L of movement of the ball nut 2. An additional disadvantage is that extraordinary precautions must be observed in production technology to severely check the accumulated pitch error, the change in the diameter of the spiral grooves and the circularity of the spiral grooves, thereby increasing cost. The tapering portions m' each connected at one end to the major diameter $d_1$ portion m and having a minor diameter end at the other end are gradually reducing its diameter in the tapering direction, so that the steering wheel could not be manipulated smoothly with a small force unless the angle of rotation of the steering wheel is large, even if the two trains of balls are brought out of engagement in the helical grooves in the major diameter $d_1$ portion m.

Figure 5:
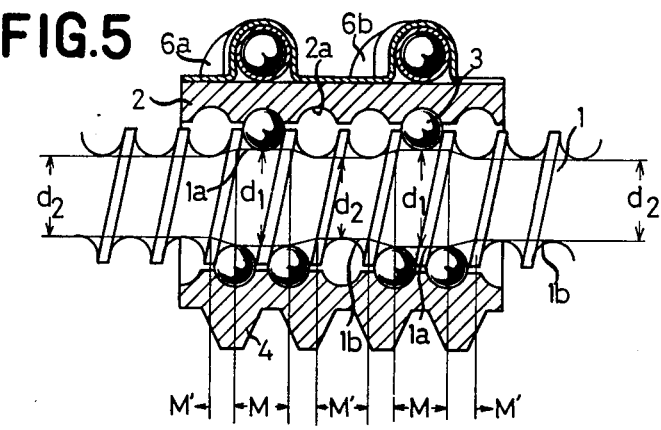
FIGS. 5 and 6 are schematic views showing the operation of the invention, with a change in a diameter of the threaded shaft being exaggerated.
Figure 6:
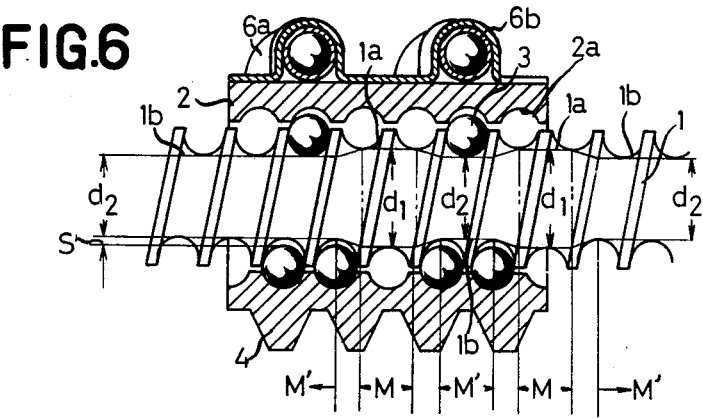

FIGS. 4 to 9 show a preferred embodiment of the invention in which a change in the diameter of the major diameter portions and the minor diameter portions is exaggerated in FIGS. 5 and 6. In FIGS. 4 and 5, the two trains of balls 3 guided by return tubes 6a and 6b are confined within passageways formed by sections of spiral grooves 1a, 1b and 2a in the threaded shaft 1 and the ball nut 2, so that the rotation of the threaded shaft 1 will move the ball nut 2 in the axial direction. For purposes of convenience, the term "grooves" will be hereafter used in lieu of the term "groove sections." The threaded shaft 1 is formed with two portions M of a major diameter $d_1$ which have a length M suitably selected to permit the balls 3 to be engaged in the helical grooves in the major diameter $d_1$ portions M only when the motor vehicle travels along a straight course, and portions M' of a minor diameter $d_2$ in which no balls are engaged when the motor vehicle travels along a straight course. The diameters $d_1$ and $d_2$ of the major and minor diameter portions M and M', which may be either the pitch diameter or the root diameter of the thread, are varied continuously through transition portions in such a manner that the balls 3 can smoothly roll along the helical grooves. The transition portions are preferably tapering portions.

In this embodiment, the minor diameter $d_2$ portions M' smaller in diameter than the major diameter $d_1$ portions M do not taper but are cylindrical in form. Thus, one minor diameter $d_2$ portion M' is interposed between the two major diameter $d_1$ portions M and one minor diameter portion M' extends outwardly of each major diameter portion M, with one tapering portion of a small length connecting the two adjacent major diameter portion M and minor diameter portion M'.

FIG. 5 shows the relative positions of the threaded shaft 1, ball nut 2 and balls 3 when the motor vehicle travels along a straight course, and FIG. 6 shows the relative positions of these parts when the steering wheel is turned clockwise (or counter clockwise). When the motor vehicle travels along a straight course, the two trains of balls 3 moving in circulation as guided by the return tubes 6a and 6b are engaged in the passageways formed by the helical groove 2a of the ball nut 2 and the helical groove 1a in the major diameter portions M of the threaded shaft 1 in such a manner that there is no play (actually the play is zero or the balls are engaged in the grooves in tight fit) between the balls 3 and the helical grooves 1a and 2a. The length of each major diameter $d_1$ portion M extends in the axial direction of the shaft 1 and is in a range which is set a minimum essential in such a manner that the balls more than one turn of each train of balls are rollingly engaged in the helical groove in each major diameter portion M when the motor vehicle travels along a straight course. Thus, the steering gear has enough rigidity so that the feel of the steering wheel in the hands of the drivers is easy about the stability of driving. If the steering wheel is turned either clockwise or counter clockwise, then the ball nut 2 moves either rightwardly or leftwardly in FIG. 5 and the balls 3 are brought into engagement in the spiral groove 2a of the ball nut 2 and the spiral groove 1b in one of the minor diameter portions M' of the threaded shaft 1 (FIG. 6). Thus, there is formed suitable play S (See FIG. 8) between the balls 3 and the helical grooves 1b and 2a.

If the balls brought out of engagement in one major diameter portion M are contacted with other major diameter portion because of a large angle of the rotation of the steering wheel, the play between the balls and other major diameter portion will become zero so that a large force must be exerted to manipulate the steering wheel. Therefore, in this invention, the axial distance l (FIG. 4) between a port 6c for balls of one return tube 6a and a port 6d for balls of other return tube 6b is set to such a degree that the above-mentioned disadvantage is eliminated. Each of two ports 6c and 6d is associated with separate return tube and is adjacent with each other. Generally, this distance l is preferably one and half lead of the helical groove or more. In this case, when the distance l is too large, a length of the ball nut 2 is too large and a compact design of the ball nut is impossible. Therefore, it is best to set the distance l to one and half lead of the helical groove. However, the distance l may be a slightly smaller than one and half lead of the helical groove depending on a length of each tube 6a, 6b and a distance l' between outer ports 6e, 6f, because the length of each tube 6a, 6b and the distance l' are variable in actual design of the steering.

Figure 7:
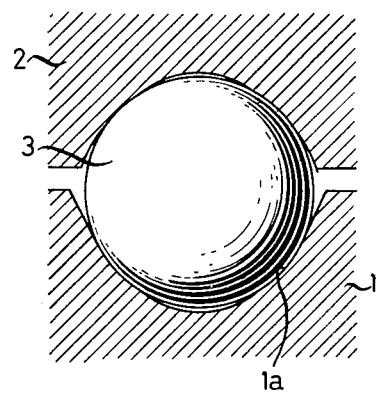
FIGS. 7 and 8 are sectional views showing the operation of the invention.
Figure 8:
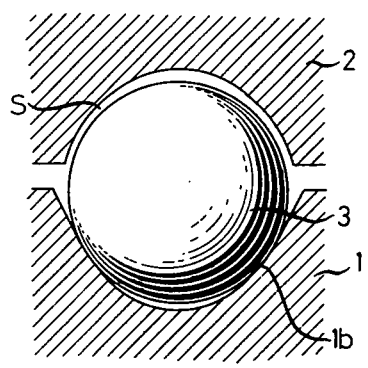

FIGS. 7 and 8 show the manner in which the ball nut 2 and the threaded shaft 1 are located relative to each other with the ball 3 being interposed therebetween. It will be seen that when the ball 3 is rollingly engaged in the helical groove 1b in the minor diameter portion M' of the threaded shaft 1, the play S is maximized. Generally, the play S is from 1/100 mm to 3/100 mm.

The major diameter $d_1$ portions M of the threaded shaft 1 each have only to have the axial length sufficiently large to enable the balls of one turn of the ball trains associated therewith to be brought into rolling engagement therewith when the motor vehicle travels along a straight course. Thus, it is possible to reduce the length of the major diameter portions M below the length of the major diameter portion m of the prior art. Moreover, when the steering wheel is turned either clockwise or counter clockwise, the balls quickly roll from the major diameter portions M to one of the minor diameter portions through the tapering portion of a small length. Thus, the balls shift smoothly from the major diameter portions M to the minor diameter portions M' through the tapering portion without any trouble. By turning the steering wheel slightly, it is possible to shift the balls from the major diameter portions to the minor diameter portions quickly and smoothly without requiring to exert a large force.

The spiral groove 1a in the major diameter portions M and the spiral groove 1b in the minor diameter portions M' are connected to each other by continuous portion such as the tapering portions of a small length as aforesaid, so that the balls 3 can roll smoothly along different diameter portions of the threaded shaft 1 when the steering wheel is manipulated. Thus, one has lonly to linearly vary the pitch diameter or the root diameter of the helical groove in the threaded shaft 1 to provide the aforesaid major diameter portions M and the minor diameter portions M'. The major diameter portions M are each connected, through the tapering portion of a small length, to one of the minor diameter portions M, so that the steering wheel can be manipulated with a small force by merely turning it clockwise or counter clockwise.

Figure 9:
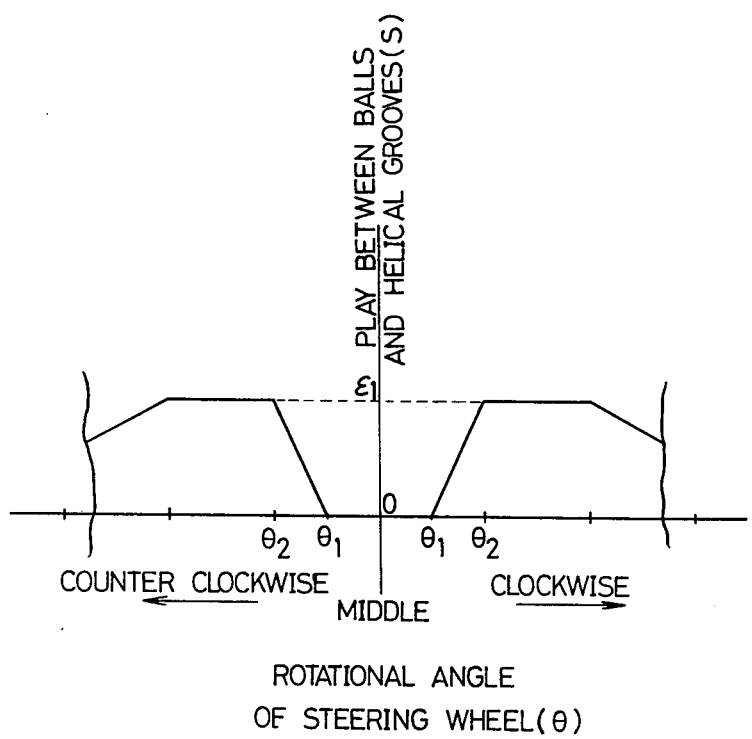
FIG. 9 is a graph in explanation of the operation of the invention.

In this invention, the range in which the play between the balls 3 and the spiral grooves 1a and 2a becomes zero is limited to a range $L_A$ ($L_B$) which is determined by the number of turns of the trains of balls 3 and the axial length of the major diameter portions M of the threaded shaft 1. Therefore, as shown in FIG. 9, when the rotational angle $\theta$ of the steering wheel increases clockwise or counter clockwise up to $\theta_1$ (the motor vehicle slightly changes its direction from a straight course to left or right), the two trains of balls 3 are engaged in the helical grooves 1a and 2a with no play between the balls and the grooves, thereby maintaining the rigidity of the steering gear during the straight movement of the vehicle. However, as the rotational angle $\theta$ increases from $\theta_1$ to $\theta_2$, the play increases from zero to $\epsilon_1$, thereby enabling the ball nut 2 to move smoothly to right or left in FIG. 4 and facilitating the manipulation of the steering wheel.

In the invention, the play between the balls and the spiral grooves is eliminated only when the motor vehicle travels along a straight course to maintain the rigidity of the steering gear, thereby completely avoiding the serpentine movement of the motor vehicle and improving the feel of the steering wheel in the hands of the driver particularly when the motor vehicle travels straight ahead at high speed. The range in which no play exists between the balls and the helical grooves is limited to a small range of essential minimum in which the balls are rollingly engaged in the helical groove 1a in the major diameter $d_1$ portion M of the threaded shaft 1, so that it is possible to smoothly manipulate the steering wheel when it is turned clockwise or counter clockwise. The invention eliminates the need to observe extraordinary precautions in maintaining machining precision of the parts at a high level with regard to the configuration of the helical threads of the ball nut and the threaded shaft, the lead of the threads and the circularity of the helical grooves, and makes it possible to readily set the range in which there is no play between the balls and the helical grooves. Thus, the invention offers advantages, from the point of view of production technology, in that the threaded shaft is simple in construction and easy to manufacture.

Figure 10:
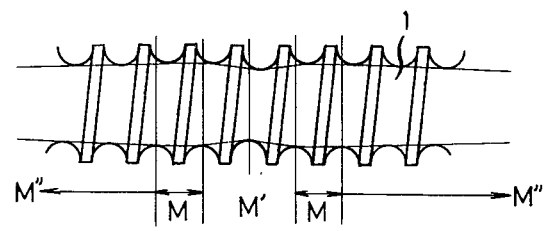
FIG. 10 is a schematic view of a threaded shaft, with a change in the diameter of the threaded shaft being exaggerated, of another embodiment of the invention.

In the abovementioned embodiment described hereinabove, each of the major diameter portions of the threaded shaft is connected to one of the cylindrical minor diameter portions through a tapering portion which has a small axial length. By this arrangement, the steering wheel can be manipulated smoothly by merely turning the wheel slightly in a desired direction. However, the invention is not limited to this construction, for example, as shown in FIG. 10, a minor diameter portion M' between major diameter portions M may have no length, and all portions M" connected at one end thereof to the major portions M may be in the form of tapering portions.

What is claimed is:

1. A ball nut type steering gear for a motor vehicle comprising;
    a threaded shaft formed with helical groove sections;
    a ball nut formed with helical groove sections and mounted over said threaded shaft for movement axially of the threaded shaft through two trains of balls;
    a rack formed on the outer periphery of said ball nut; and a sector gear in meshing engagement with said rack;
    said two trains of balls being confined in passageways formed by respective ones of the helical groove sections in said threaded shaft and said ball nut so as to move the ball nut axially of the threaded shaft as the latter is rotated to thereby rotate said sector gear to change the direction of travel of the motor vehicle;
    wherein the improvement comprises:
    two major diameter portions formed in said threaded shaft and spaced apart from each other by a minor diameter portion, so that said two trains of balls are brought into engagement in the helical groove sections in the major diameter portions of the threaded shaft and the ball nut only when the motor vehicle travels along a straight course and there is no play between the balls and the helical groove sections in which the balls are brought into rolling engagement.

2. A ball nut type steering gear as set forth in claim 1, wherein said steering gear further comprises two return tubes in which the balls of two trains are guided, and the axial distance between adjacent ports each associated with separate return tube corresponds to a one and a half leads of the helical groove sections.

3. A ball nut type steering gear as set forth in claim 1, wherein said threaded shaft comprises cylindrical minor diameter portions smaller in diameter than said major diameter portions, and transition portions connecting one of the major diameter portions to one of the minor diameter portions.

4. A ball nut type steering gear as set forth in claim 3, wherein said transition portions are tapering portions.

* * * * *